United States Patent [19]

Iijima et al.

[11] Patent Number: 5,191,454
[45] Date of Patent: Mar. 2, 1993

[54] MULTI-COLORED LIQUID CRYSTAL DISPLAY DEVICE

[75] Inventors: Chiyoaki Iijima; Hiroshi Wada; Kanemitsu Kubota, all of Nagano, Japan

[73] Assignee: Seiko Epson Corporation, Tokyo, Japan

[21] Appl. No.: 374,209

[22] Filed: Jun. 30, 1989

[30] Foreign Application Priority Data

Jul. 6, 1988 [JP] Japan ............................ 63-169368
Jul. 25, 1988 [JP] Japan ............................ 63-185093

[51] Int. Cl.⁵ .............................................. G02F 1/13
[52] U.S. Cl. ................................. 359/64; 359/78; 359/93; 359/63
[58] Field of Search ............ 350/347 E, 337, 332, 350/347 R; 359/78, 63, 64, 84, 91, 93; 340/784 A, 784 B

[56] References Cited

U.S. PATENT DOCUMENTS

| | | | |
|---|---|---|---|
| 4,097,128 | 6/1978 | Matsumoto et al. | 359/93 |
| 4,443,065 | 4/1984 | Funada et al. | 350/347 E |
| 4,664,482 | 5/1987 | Kando et al. | 350/337 |
| 4,759,612 | 7/1988 | Nakatsuka et al. | 350/337 |
| 4,842,379 | 6/1989 | Oishi et al. | 359/93 |
| 4,944,578 | 7/1990 | Denison | 359/93 |

FOREIGN PATENT DOCUMENTS

| | | | |
|---|---|---|---|
| 0266184 | 5/1988 | European Pat. Off. | 350/347 E |
| 60-6927 | 1/1985 | Japan | 350/337 |

Primary Examiner—Rolf Hille
Assistant Examiner—Minhloan Tran
Attorney, Agent, or Firm—Blum Kaplan

[57] ABSTRACT

A liquid crystal display device capable of displaying multiple colors in response to application of different driving voltages includes a liquid crystal cell with two polarizers and the value of the product of the optical anisotropy $\Delta n$ of the nematic liquid crystal material and the thickness d of the liquid crystal layer is in excess of 1.1 μm. A second liquid crystal cell can be included between the first cell and one of the polarizers. A driver circuit drives the liquid crystal cells by the dynamic drive method by applying a selecting voltage, a non-selecting voltage, and one or more intermediate voltages to generate the different colors.

19 Claims, 9 Drawing Sheets

FIG.7
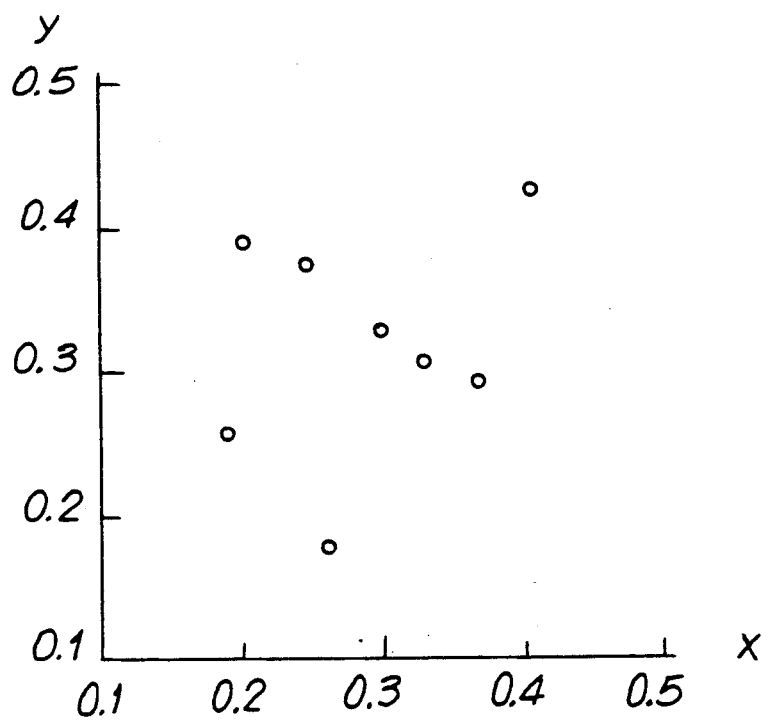
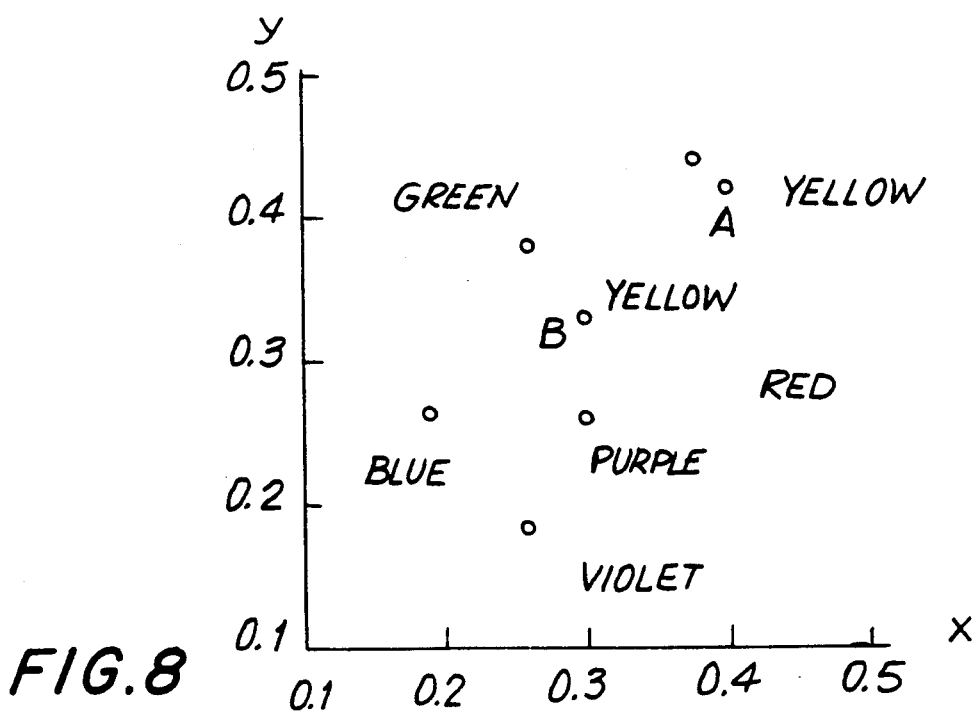
FIG.8

MULTI-COLORED LIQUID CRYSTAL DISPLAY DEVICE

BACKGROUND OF THE INVENTION

The invention relates generally to an electrooptical device and more particularly to a nematic multi-colored liquid crystal display that does not require the use of color filters to vary the color of the display.

As described in Japanese Patent Laid-Open No. 50511/1985, certain liquid crystal displays include supertwisted nematic liquid crystal material in which the twist angle of the liquid crystalline molecules exceeds 180°. The product of the optical anisotropy ▲n and the thickness d of the liquid crystal layer is 0.7 to 1.1 μm. This liquid crystal display (LCD) is colored because double refraction birefringence occurs when it is driven by a dynamic drive. A non-selecting voltage turns the display yellow and a selecting voltage turns the display blue. Intermediate voltages turn the color of the LCD from yellow to blue through a somewhat blue-green intermediate color stage as shown in the CIE chromaticity diagram of FIG. 18. The LCD cannot exhibit many other colors outside of this range. Accordingly, one cannot obtain a sufficiently large variety of colors by applying intermediate voltages and selecting and non-selecting voltages.

Other color LCD devices include color filters to display multiple colors. These devices typically include sets of three pixels covered with filters of the additive primary color: red, green and blue. However, providing pixel sized color filters over individual LCD displays involves intricate manufacturing techniques and can be costly and complex.

Accordingly, it is desirable to provide a full color electrooptical device which overcomes the shortcomings of the prior art.

SUMMARY OF THE INVENTION

Generally speaking, in accordance with the invention, an electrooptical device including a liquid crystal cell having a pair of opposed electrode plates and twisted nematic liquid crystal material disposed between the electrode plates is provided in which the product of the optical anisotropy (▲n) of the nematic liquid crystal and the thickness d of the nematic liquid crystal is in excess of 1.1 μm. In a preferred embodiment, the nematic liquid crystal material has a twist angle of from about 180° to 360°. The cell also includes a pair of polarizers disposed on both sides of the liquid crystal cell and a voltage source to apply voltage between the electrode plates to assume three or more values. The device can display multiple colors by activating the device with different voltages.

Accordingly, an object of the invention is to provide an improved color electrooptical device.

Another object of the invention is to provide an electrooptical device which will display different colors when different voltages are applied thereto.

A further object of the invention is to provide a multi-color LCD device that does not require color filters positioned over the LCD's.

Still another object of the invention is to provide an electrooptical device which can provide sufficient contrast when driven by a dynamic drive technique at a low duty ratio such as below 1:100.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

FIGS. 3, 4, 5, 6, 7, 8 are chromaticity diagrams showing color tones created by specific examples utilizing the device of FIG. 1.

DESCRIPTION OF THE PREFERRED EMBODIMENTS

Figure 1:
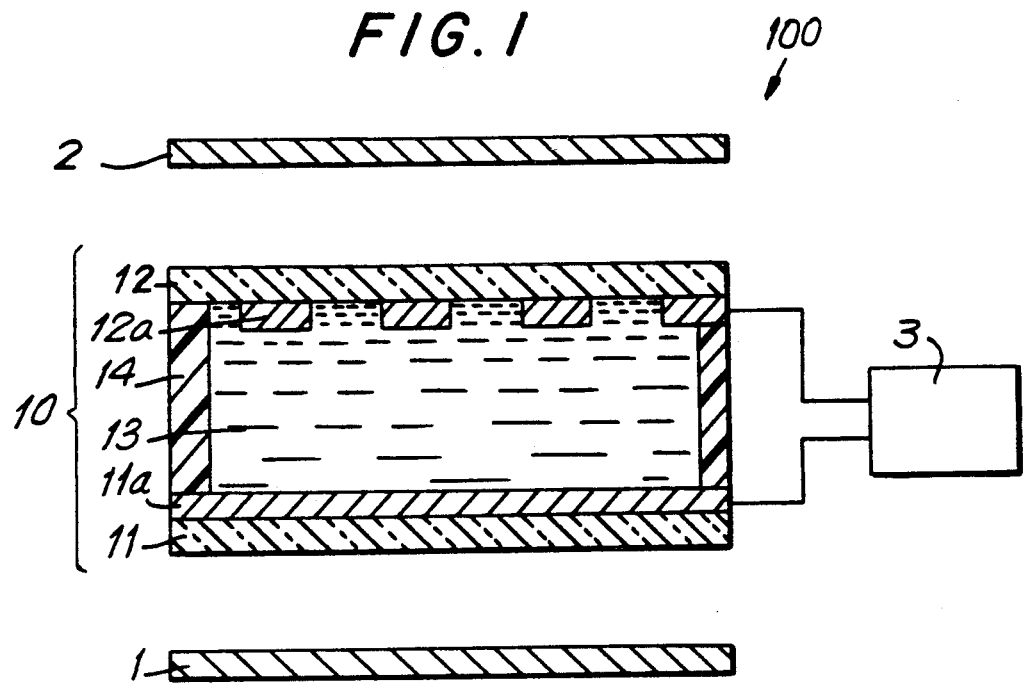
FIG. 1 is a schematic cross-sectional view of a liquid crystal display formed in accordance with the invention.

A liquid crystal display device 100 formed in accordance with the invention is shown schematically in cross section in FIG. 1. Device 100 includes a lower polarizer 1, an upper polarizer 2, and a liquid crystal cell 10 interposed between polarizers 1 and 2.

Liquid crystal cell 10 includes a lower electrode plate 11 having at least one electrode 11a disposed on its inner surface and an upper electrode plate 12 having a plurality of electrodes 12a disposed on its inner surface. A spacer 14 is mounted between electrode plates 11 and 12 to form space therebetween which is filled with a nematic liquid crystal material 13. Spacers 14 maintain a uniform distance between plates 11 and 12 to provide a liquid crystal cell having a uniform thickness. Additional spacer members such as glass fibers or glass balls may be dispersed between plates 11 and 12. The portions of electrode plates 11 and 12 in contact with nematic liquid crystal material 13 have an orientation direction applied by rubbing or are otherwise processed so that nematic liquid crystal molecules adjacent to the plates will be aligned with the orientation direction.

A driver circuit 3 is provided for driving liquid crystal cell 10 and is electrically coupled to electrodes 11a and 12a. Driver circuit 3 utilizes dynamic driving in which the driver circuit applies a selecting voltage, a non-selecting voltage, and one or more intermediate voltages selectively between electrodes 11a and 12a on electrode plates 11 and 12 to display multiple colors.

Figure 2:
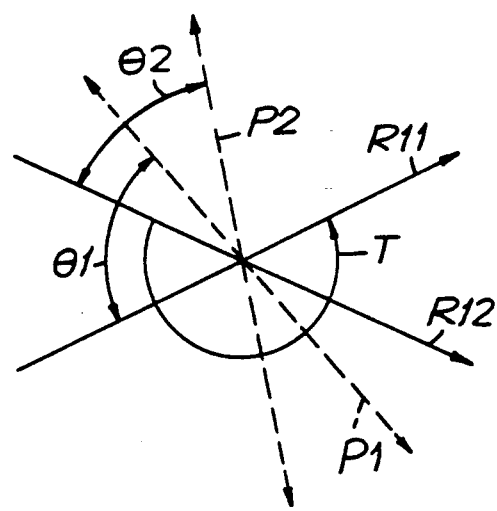
FIG. 2 is a diagram illustrating the relationship of the absorption axes of the polarizers to the directions of rubbing for the liquid crystal display shown in FIG. 1.

FIG. 2 illustrates the relationship between the axes of the liquid crystal molecules adjacent to electrode plates 11 and 12 and the absorption axes of polarizers 1 and 2. Although the method of orienting the liquid molecules is not limited to rubbing the plates, the orientation directions of the long axes of the liquid crystals adjacent to electrode plates 11 and 12 are referred to as the same as the directions in which the electrode plates are rubbed, for convenience of explanation. This assumption is also applied to the additional embodiments described later.

Referring to FIG. 2, lower electrode plate 11 and upper electrode plate 12 are rubbed in directions indicated by $R_{11}$ and $R_{12}$, respectively. The liquid crystal molecules in liquid crystal 13 of cell 10 are twisted downwardly shown in FIG. 1. The direction and angle of twist are indicated by a curve T. The directions of the absorption axes or polarization axes of lower polarizer 1 and upper polarizer 2 are denoted by $P_1$ and $P_2$, respectively. Direction $P_1$ of the absorption axis of lower polarizer 1 forms an angle $\theta_2$ with orientation direction $R_{12}$ of rubbing of upper electrode plate 12.

Upper and lower electrode plates 11 and 12 are positioned so that the twist angle T of the liquid crystal molecules is in the range of about 180° to 360°. In cell 10, the direction and the angle of the twist (T) of the liquid crystal molecules are determined by rubbing directions $R_{11}$, $R_{12}$ and the type and amount of the optically active substance added to nematic liquid crystal material 13. Preferably, angles $\theta_1$ and $\theta_2$ formed between the orientation directions and the absorption axis of each polarizer, is in the range of about 15° to 75°. The product of the optical anisotropy $\Delta n$ and the thickness d (in μm) of the liquid crystal layer is a value greater than about 1.1 μm.

The voltage applied between electrodes 11a and 12a on electrode plates 11 and 12 is varied to reduce the retardation of liquid crystal layer 13. This changes the color of light transmitted through device 10. This color change can be increased by increasing the change in retardation. For this purpose, it is necessary to increase the initial value of the product $\Delta n \cdot d$. It has been found that multiple colors can be displayed readily under the condition that the initial value of the product $\Delta n \cdot d$ is in excess of 1.1 μm. This facilitates displaying a sufficiently large number of colors by varying the applied voltage among several values. No limitations are imposed on the upper limit of the product $\Delta n \cdot d$. Multiple colors can be displayed however large the value of the product $\Delta n \cdot d$. However, under current practical conditions, the optical anisotropy $\Delta n$ can only be increased up to about 0.25 and should be greater than about 0.1; the cell should preferably be between about 5 and 12 μm; and considering the response speed, the value of the product $\Delta n \cdot d$ is typically less than about 2.5.

In order to increase the number of colors displayed, it is preferable to activate the LCD by the dynamic drive. The above-described structure offers a display of suitable contrast, even if it is driven at a low duty ratio e.g., less than 1/100.

The ability of the LCD to generate colors is caused by double refraction birefringence of the liquid crystal material and requires that orientation directions and the absorption or polarization axes of the polarizers differ. This is especially true when the angles that the orientation directions form with the directions of the absorption axes $\theta_1$ and $\theta_2$ are set within the range of 15° to 75° and colors can be displayed with high contrast and high color purity.

The invention will be explained in greater detail with reference to the following examples. These examples are presented for the purposes of illustration only, and are not intended to be construed in a limiting sense.

EXAMPLE 1

An LCD having the structure of device 100 with directional parameters shown in FIG. 2 was prepared. Nematic liquid crystal material 13 was a phenyl cyclohexane (PCH) liquid crystal material. The optical anisotropy ($\Delta n$) was 0.13, the thickness d of the liquid crystal layer was 10 μm and the product n·d was 1.3 μm. The twist angle T of the liquid crystal material was 180°. Angles $\theta_1$ and $\theta_2$ between the directions of rubbing and the absorption axes of the polarizers were 30° and 60°, respectively. Liquid crystal cell 10 was driven by driver circuit 3 in the dynamic mode with four different voltage values at a duty ratio of 1/100.

Varying the driving voltage affected the color displayed by the cell. A non-selecting voltage having an effective voltage of 2.10 V applied to the cell turned the cell blue-green. When a selecting voltage having an effective voltage of 2.32 V was applied, the cell turned red. When two intermediate voltages having effective voltages of 2.17 V and 2.25 V, respectively, were applied to the cell, it turned blue and purple, respectively while different colors were effectively displayed, the response time was slow, more than 600 ms.

The composition of the liquid crystal material of Example was the following:

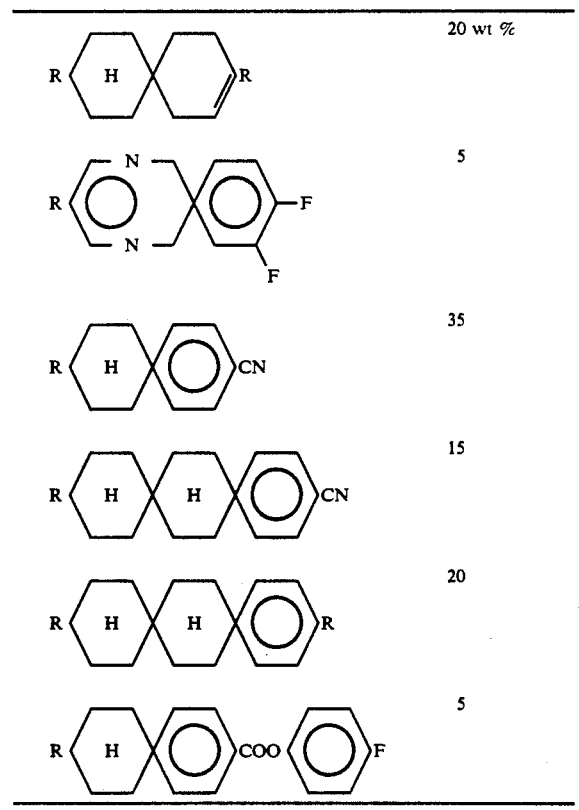

wherein R is an alkyl group

EXAMPLE 2

A display similar to that of Example 1 including a tolane liquid crystal material was employed. The optical anisotropy (Δn) was 0.18, the thickness (d) of the liquid crystal layer was 8 μm and the product was 1.44 μm. The procedure followed was similar to Example 1. The liquid crystal device displayed four colors as in Example 1, and the response time was improved to 300 ms.

The composition of the liquid crystal material of Example 2 was the following:

| Structure | wt % |
|---|---|
| R–H–R (with double bond) | 5 |
| R–H–⌬–CN | 10 |
| R–⌬–⌬–CN | 30 |
| R–⌬–C≡C–⌬–OR | 15 |
| R–H–⌬–C≡C–⌬–R | 20 |
| R–H–⌬–⌬–R | 20 | wherein R is an alkyl group

EXAMPLE 3

Figure 3:
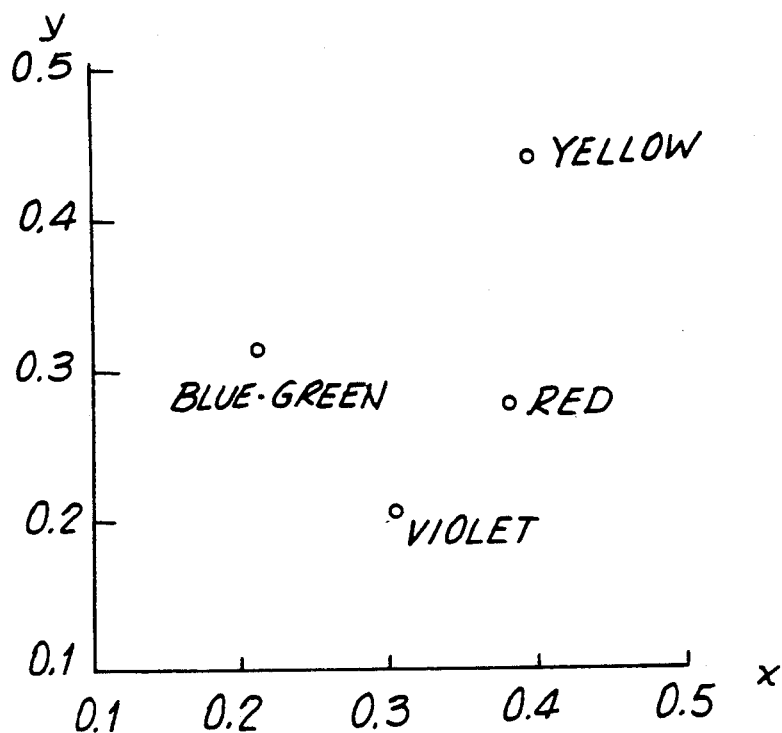

Utilizing the device of Example 2, the procedures of Examples 1 and 2 were followed, except that the twist angle T of the liquid crystal material was 220° and the angles θ₁ and θ₂ between the directions of rubbing formed and the absorption axes of the polarizers were 45°. The liquid crystal device was driven by driver circuit 3 with four different voltages at a duty ratio of 1/100. The device exhibited four colors as shown in the chromaticity diagram of FIG. 3.

EXAMPLE 4

Figure 4:
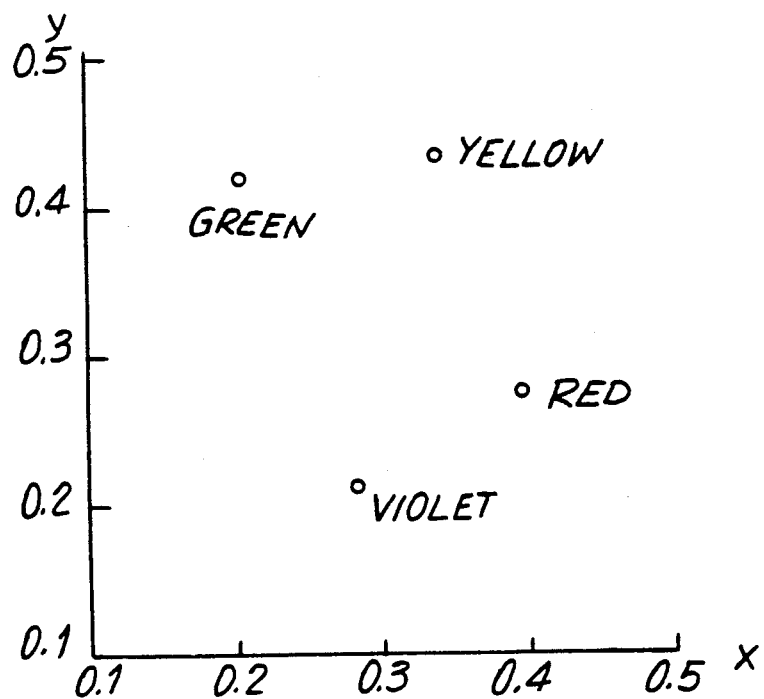

The procedure of Example 3 was followed, except that the twist angle T of the liquid crystal material as changed to 230°. The device was driven by driver circuit 3 with four different voltages at a duty ratio of 1/100. The color tones obtained by this example are shown in the chromaticity diagram of FIG. 4. The device displayed yellow in addition to the three primary colors; red, green and blue.

EXAMPLE 5

Figure 5:
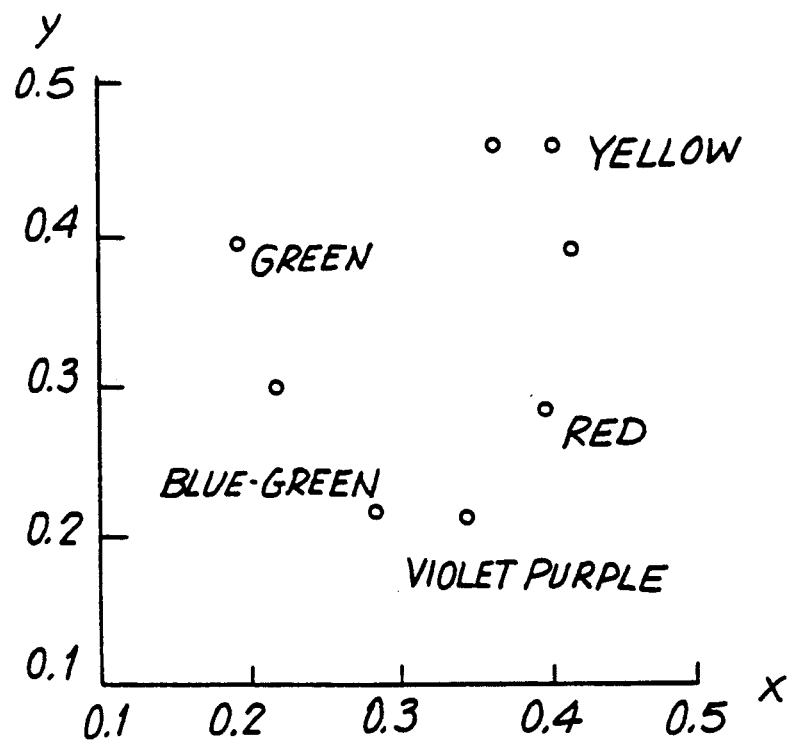

The liquid crystal display device of Example 4 was driven by driver circuit 3 at eight different voltages at a duty ratio of 1/200. A non-selecting voltage having an effective voltage of 2.24 V turned the liquid crystal display green. A selecting voltage having an effective voltage of 2.4 V turned the display yellow. When intermediate voltages having effective voltages of 2.26 V, 2.29 V, 2.31 V, 2.33 V, 2.35 V, 2.38 V, respectively were applied to the liquid crystal cell, it turned blue-green, blue, purple, red, orange, yellowish orange, respectively. The color tones obtained are shown in FIG. 5 which shows that applying different voltages created a different color for all eight different voltages. The response time was 400 ms.

EXAMPLE 6

The procedures of Example 5 were followed, except that the thickness (d) of the liquid crystal cell including tolane having an optical anisotropy (Δn) of 0.21 was changed to 5.5 μm. Accordingly, the value of the product (d·Δn) was 1.155. The response time improved to 250 ms.

The composition of the liquid crystal material of Example 6 was the following:

| Structure | wt % |
|---|---|
| R–⌬–⌬–CN | 40 |
| R–⌬–C≡C–⌬–R | 20 |
| R–H–⌬–⌬–R | 20 |
| R–H–⌬–C≡C–⌬–R | 20 | wherein R is an alkyl group

EXAMPLE 7

Figure 6:
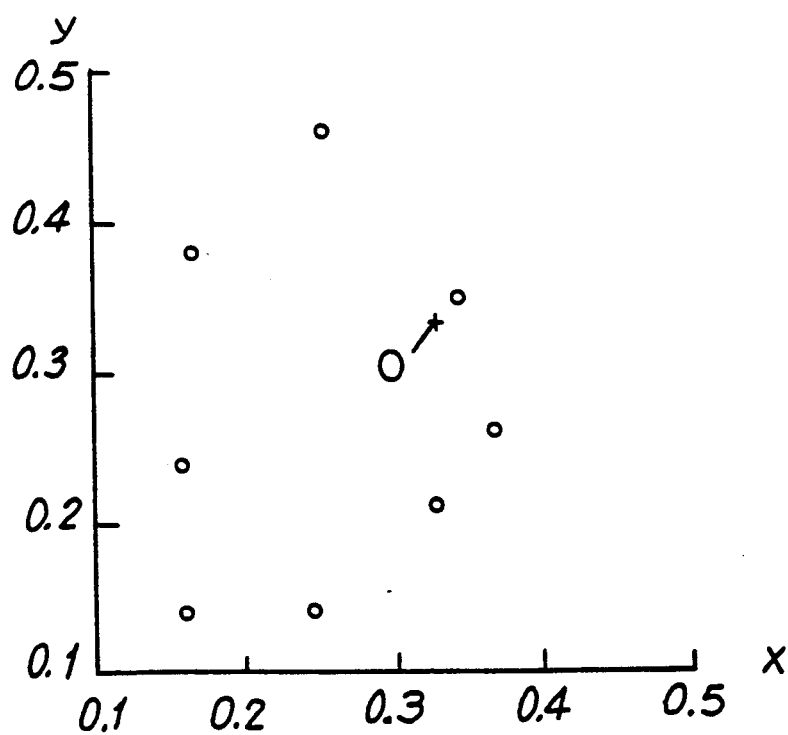

The procedures of Example 6 were followed, except the twist angle T was set at 260°. The angles between the axes of polarization of polarizers 1 and 2 was set at 10°. The liquid crystal was driven by driver circuit 3 at eight different voltages at a duty ratio of 1/200. When a non-selecting voltage having an effective voltage of 2.28 V was applied to the liquid crystal material, it turned red and a selecting voltage having an effective voltage of 2.44 V turned the liquid crystal orange. Intermediate voltages turned the display blue-green, yellow, and other color tones as shown in the chromaticity diagram of FIG. 6.

The angle formed between the absorption angles of polarizers 1 and 2 was then set to 80° and eight color tones, complimentary to the above-described colors, were obtained. These complimentary colors are located substantially on the opposite sides of the white point 0 from the colors indicated by the points in FIG. 6.

EXAMPLE 8

The twist angle T of the liquid crystal material in the display cell of Example 7 was increased to 330°. The liquid crystal molecules were oriented by subjecting the substrates to oblique evaporation rather than rubbing. The angle of visibility obtained was wider than in Example 7.

Examples 1-6 were repeated with increased twist angle and it was observed that increasing twist angle T increased the angle of visibility.

EXAMPLE 9

A liquid crystal cell as in Example 1 including a liquid crystal composition of tolane and PCH was assembled. The optical anisotropy $\Delta n$ was 0.18, the thickness d of the liquid crystal layer was 9 $\mu$m and the product $n \cdot d$ was 1.62 $\mu$m. The twist angle T of the liquid crystal was 180°. Angles $\theta_1$ and $\theta_2$ formed between the directions of rubbing and the absorption axes of the polarizers were 30° and 60°, respectively. The liquid crystal was driven by driver circuit 3 at four different voltages at a duty ratio of 1/100. The liquid crystal displayed four colors, green, blue, red and yellow. However, the response time was 1000 ms. which is considerably slow.

The composition of the liquid crystal material of Example 9 was the following:

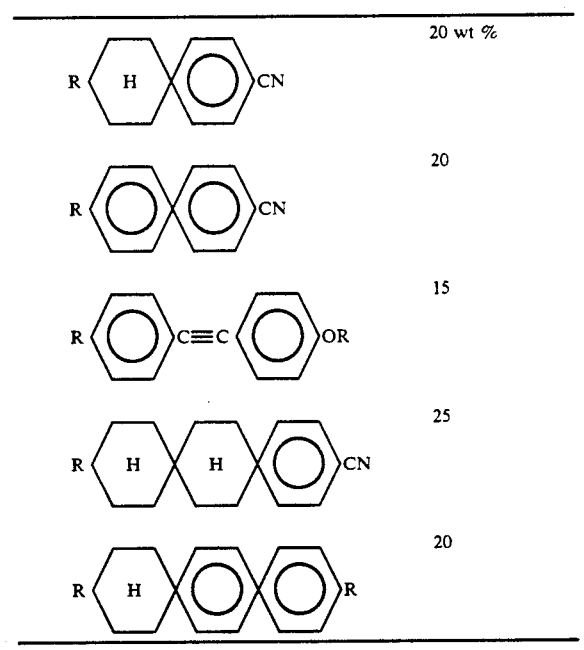

wherein R is an alkyl group

EXAMPLE 10

The proportion of tolane in the liquid crystal composition in the device of Example 9 was increased. The optical anisotropy $\Delta n$ was set to 0.22, the thickness d was set to 7 $\mu$m, and the product was 1.54 $\mu$m. The same examination was performed as in Example 9. The liquid crystal displayed four colors as in Example 9, and the response time was improved to 400 ms.

The composition of the liquid crystal material of Example 10 was the following:

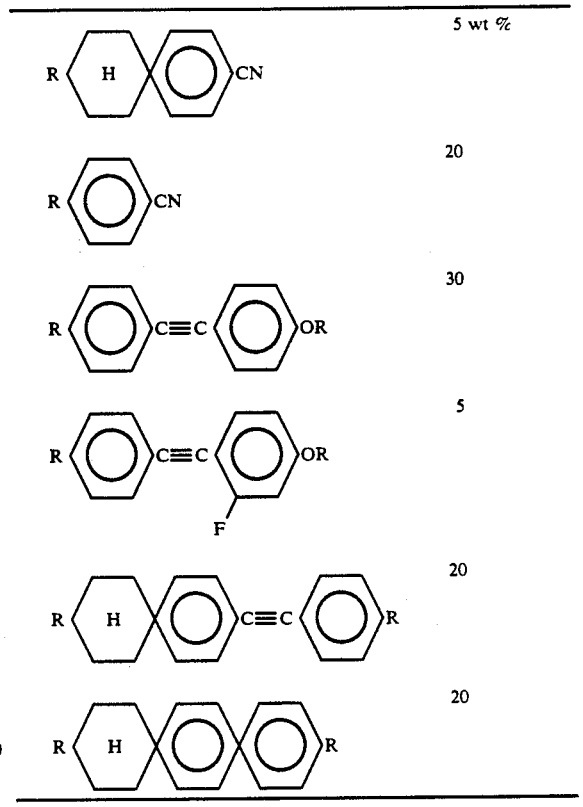

wherein R is an alkyl group

EXAMPLE 11

The liquid crystal display device of Example 10 was modified to have a liquid crystal thickness of 9 $\mu$m and a twist angle T of 240°. Angles $\theta_1$ and $\theta_2$ between the directions of rubbing and the absorption angles of the polarizers were both 45°. The liquid crystal cell was driven by driver circuit 3 at eight different voltages at a duty ratio of 1/200. The liquid crystal cell displayed eight colors including light green, green, blue, red and yellow as shown in the chromaticity diagram of FIG. 7.

EXAMPLE 12

A liquid crystal display device as in Example 11 was prepared, except that the twist angle T was set to 260°. The same examination was conducted as in Example 11. The color tones obtained are shown in the chromaticity diagram of FIG. 8. Points A and B are both yellow, but point A has a higher yellow purity than point B. That is, two kinds of yellow having different color purities were obtained.

EXAMPLE 13

The twist angle T of the liquid crystal material of Example 12 was increased to 330°. The liquid crystal molecules were oriented by oblique evaporation instead of rubbing. A wider angle of visibility was obtained than in Example 12. Similar advantages could be had by increasing the twist angle T of each liquid crystal material in Examples 9-11.

An example of driver circuit 3 which enables the liquid crystal cell to display several colors as described above is a pulse duration control circuit which controls the pulse duration determining the selecting period.

Another example of a driving circuit is a frame selection number control circuit which controls the selected number within plural frames. In Examples 1-13 described above, the frame selection number control circuit was used. The pulse duration control circuit can also be employed with similar utility.

Figure 9:
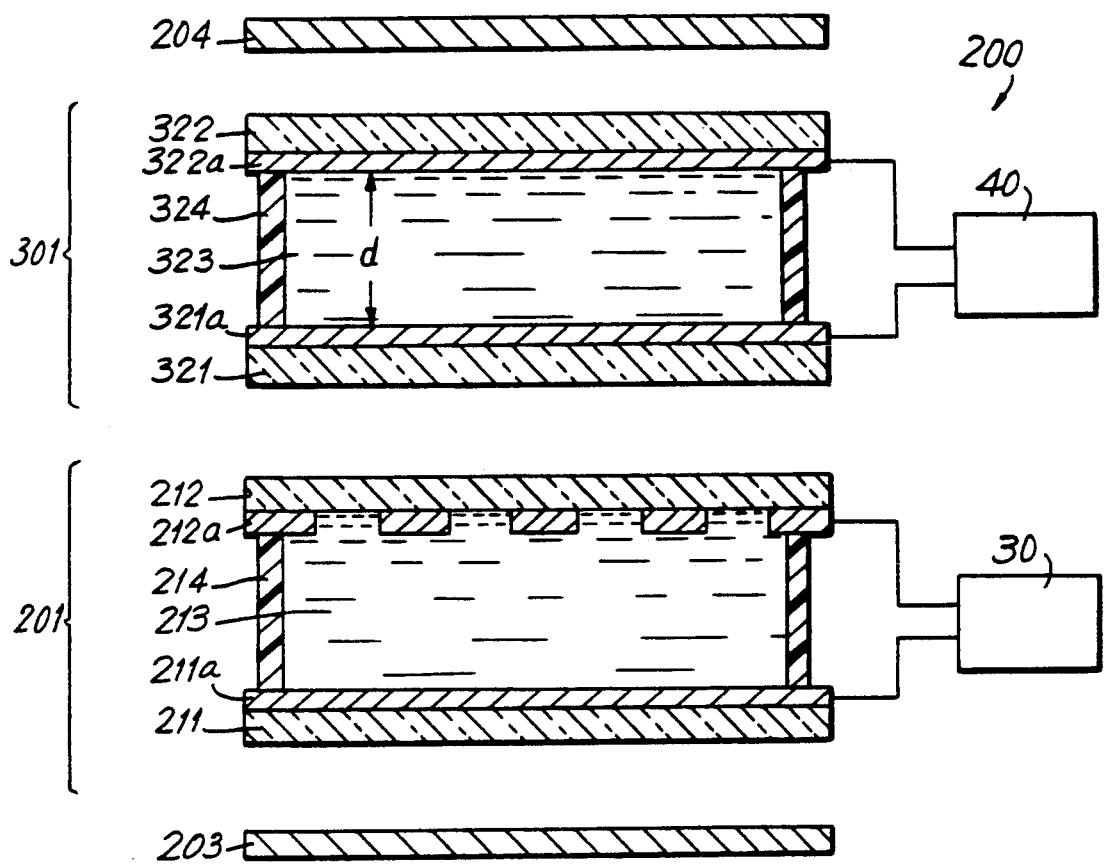
FIG. 9 is a schematic cross-sectional view of a liquid crystal display device formed in accordance with another embodiment of the invention.

FIG. 9 is a schematic cross-section of a liquid crystal display device 200 including a lower liquid crystal cell 201 and an upper liquid crystal cell 301. A lower polarizer 203 and an upper polarizer 204 are disposed on the outer surfaces of cells 201 and 301. Lower cell 201 includes the same elements as cell 10 of FIG. 1. A pair of opposed substrates 211 and 212 have electrodes 211a and 212a selectively disposed thereon and are spaced apart by a spacer 214. A liquid crystal material 213 is disposed in the space between substrates 211 and 212 and is driven by a driver circuit 30.

Upper liquid crystal cell 301 is positioned between lower cell 201 and upper polarizer 204. Cell 301 includes a lower electrode plate 321 having an at least one electrode 321a on its inner surface and an upper electrode plate 322 having an electrode 322a on its inner surface. A spacer 324 is placed between electrode plates 321 and 322 to form a space of uniform thickness d filled with a nematic liquid crystal material 323. The orientation of liquid crystal molecules adjacent to electrode plates 321 and 322 is fixed by rubbing or otherwise treating plates 321 and 322 as described above. A driver circuit 40 is used to drive second cell 301 and is electrically coupled to electrodes 321a and 322a. Driver circuit 40 of second cell 301 is a static driver circuit and can apply any arbitrary voltage between electrodes 321a and 322a.

Figure 10:
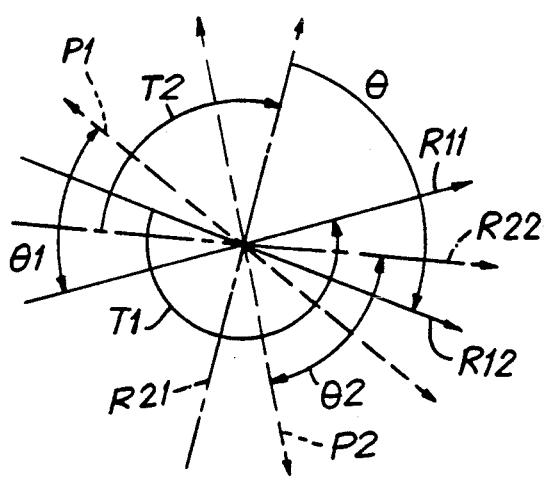
FIG. 10 is a diagram illustrating the relationship of the absorption axes of polarizers to the directions of rubbing for the liquid crystal display shown in FIG. 9.

FIG. 10 is a diagram illustrating the relationship of rubbing directions of the liquid crystal display shown in FIG. 9 i.e., the directions of the axes of the liquid crystal molecules adjacent to the electrode plates, to the absorption axes of the polarizers. Referring to FIGS. 9 and 10, lower electrode plate 211 of first cell 201 is rubbed in a direction indicated by $R_{11}$ and upper electrode plate 212 is rubbed in a direction indicated by $R_{12}$. The direction of rubbing ($R_{12}$) of upper electrode plate 212 of first cell 201 forms an angle $\theta$ with the direction of rubbing ($R_{21}$) of lower electrode plate 321 of second cell 301.

The liquid crystal material in first cell 201 is twisted downwardly as viewed in the orientation shown in FIG. 9. The direction and the angle of the twist of liquid crystal material 213 in cell 201 is indicated by $T_1$. The direction and the angle of twist of liquid crystal molecules 323 in second cell 301 is indicated by $T_2$. The absorption axes of lower polarizer 203 and upper polarizer 204 are indicated by $P_1$ and $P_2$, respectively. The direction $P_1$ of the absorption axis of lower polarizer 203 forms an angle $\theta_1$ with the direction of rubbing ($R_{11}$) of lower electrode plate 211 of first cell 201. The direction of the polarization axis of upper polarizer 204 ($P_2$) forms an angle $\theta_2$ with the direction of rubbing of the upper electrode plate 22 ($R_{22}$) of second cell 301.

The direction and angle $T_1$ of the twist given to the liquid crystal cell molecules of first cell 201 are set to a value of from about 180° to 360°, depending on the type and amount of the rotatory polarization dopant added to nematic liquid crystal 213 and also on the directions of rubbing $R_{11}$, $R_{12}$, as in the embodiment shown in FIGS. 1 and 2. The value of the product of the optical anisotropy $\Delta n$ of the liquid crystal of first cell 201 and the thickness d of the liquid crystal layer is set to be greater than about 1.1 μm.

A black-and-white display particularly well suited for inclusion in a personal computer or the like for displaying black text on a white background can be realized by switching the electric signal applied to second cell 301 between two predetermined values. The twist angle $T_2$ of the nematic liquid crystal of second cell 301 is preferably set to 90°×n±40°, wherein n is 0 or an integer, preferably less than 6 and more preferably less than 5, to provide a black-and-white display with high contrast. It is preferred to set angle $\theta$ to 90°. The direction of twist given to the liquid crystal of the second cell is preferably the reverse of the direction of the twist given to the liquid crystal of the first cell.

EXAMPLE 14

Liquid crystal material 213 of first cell 201 was PCH including tolane. The optical anisotropy $\Delta n$ was 0.18 and the thickness d of the liquid crystal layer was set to 8 μm. The product $\Delta n \cdot d$ was 1.44 μm. The liquid crystal molecules of first cell 201 were twisted to the left through 220° ($T_1$=220°) and the liquid crystal molecules of the second cell were twisted to the right through 90° ($T_2$=90°). Angles $\theta_1$ and $\theta_2$ were set to 45°. Angle $\theta$ was set to 90°.

Figure 11:
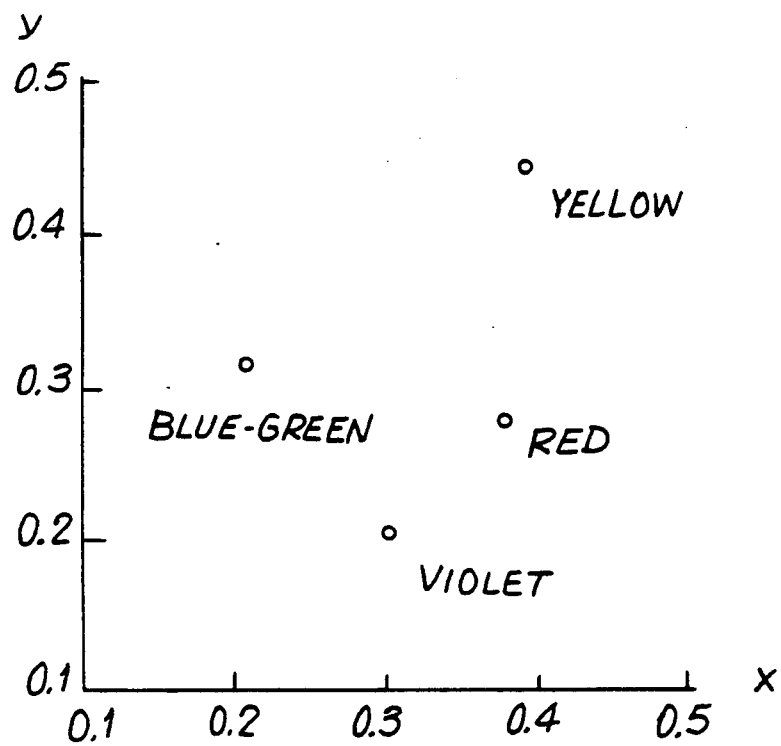
FIGS. 11, 12, 13, 14, 15 are chromaticity diagrams showing color tones created by specific examples utilizing the device of FIG. 9.
Figure 12:
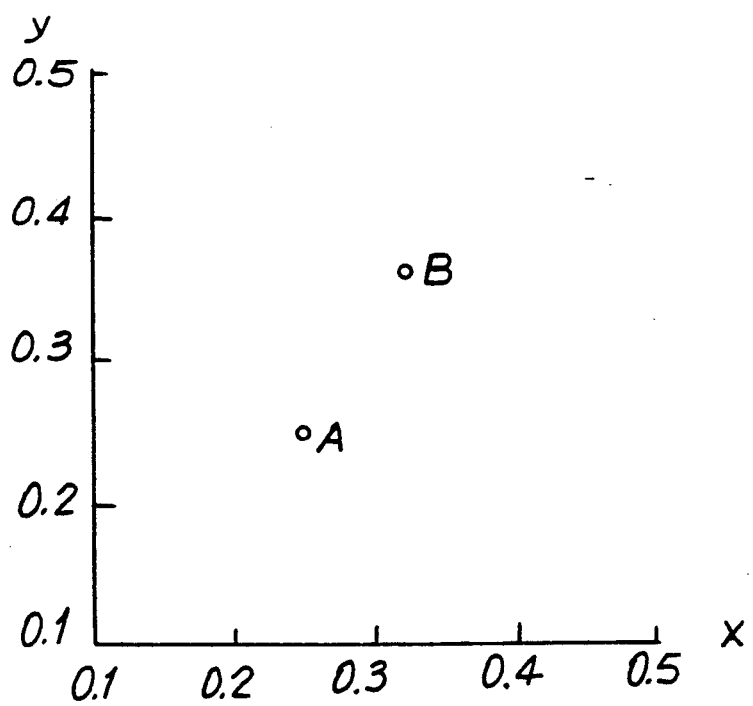

An effective voltage of 10 V was applied to second cell 301 by static driver circuit 40. First cell 201 was driven by driver circuit 30 by dynamic driving at a duty rat of 1/100 at four different voltages. Four colors: blue-green, violet, red and yellow were displayed as shown in the chromaticity diagram of FIG. 11. Driver circuit 40 for second cell 301 was then turned off. As shown in FIG. 12, a non-selecting voltage having an effective voltage of 2.24 V caused the display to turn bluish black as shown at point A. A selecting voltage having an effective voltage of 2.4 V caused the display to turn yellowish white as shown at point B. Thus, a substantially black-and-white display having a contrast ratio of 1:10 was provided.

The composition of the liquid crystal material of Example 14 was the following:

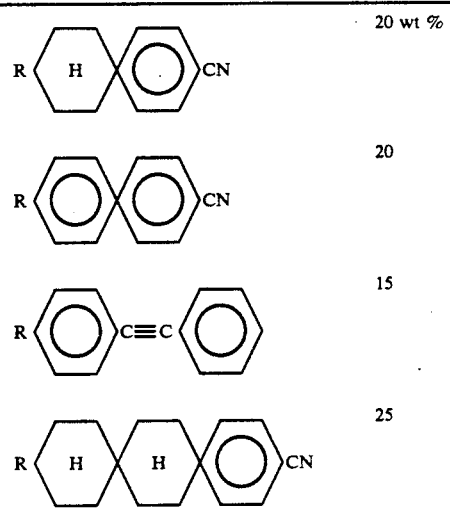

wherein R is an alkyl group

EXAMPLE 15

Figure 13:
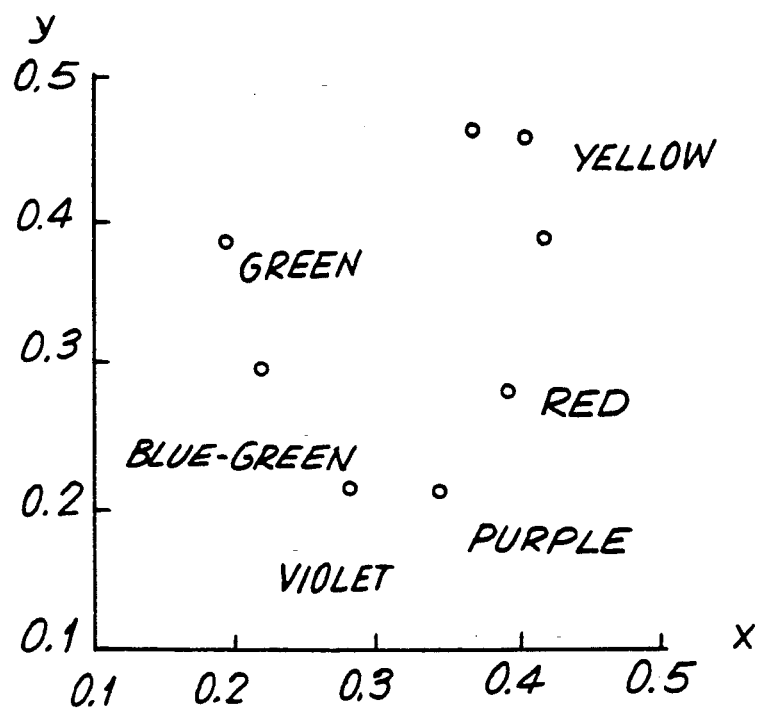
Figure 14:
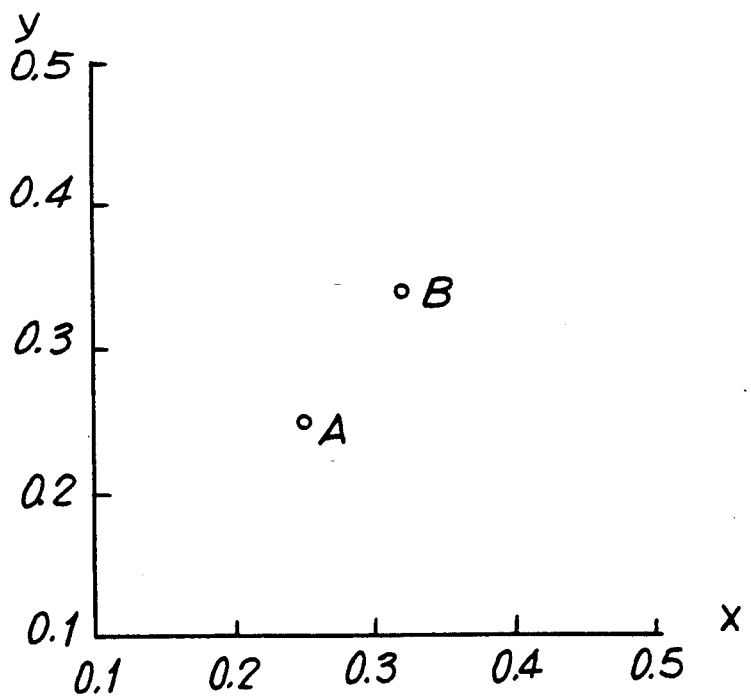

A display as in Example 14 was assembled, except that the liquid crystal molecules of first cell 201 were twisted to the left through 230° ($T_1=230°$) and that the liquid crystal molecules of second cell 301 were twisted to the right through 270° ($T_2=270°$). Driver circuit 40 for second cell 301 applied an effective voltage of 10 V to second cell 301. Driver circuit 30 drove first cell 201 at eight different voltages at a duty ratio of 1/200. The color tones obtained are shown in the chromaticity diagram of FIG. 13. The application of each different voltage created a different color tone. Driver circuit 40 for second cell 301 was then turned off. A non-selecting voltage having an effective voltage of 2.28 V turned the display a bluish black tone as shown at point A. A selecting voltage having an effective voltage of 2.44 V turned the display a yellowish white as shown at point B. As a result, a substantially black-and-white display having a contrast ratio of 1:15 was provided.

EXAMPLE 16

The display device of Example 15 was modified so that the electrode pattern on one of electrode plates 321a or 322a of second cell 301 was identical to the electrode pattern of first cell 201. Second cell 301 was statically driven electrode by electrode. The display mode could be switched at will between color display and black-and-white display for each line by switching the voltage applied to second cell 301 between 10 V and 0 V. Both types of displays could be provided simultaneously on the same screen.

EXAMPLE 17

Figure 15:
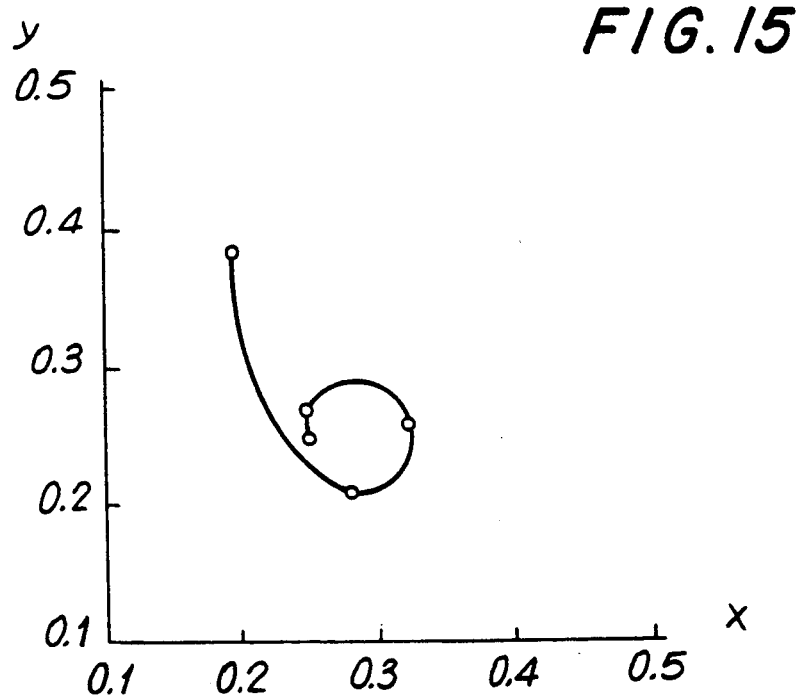
Figure 18:
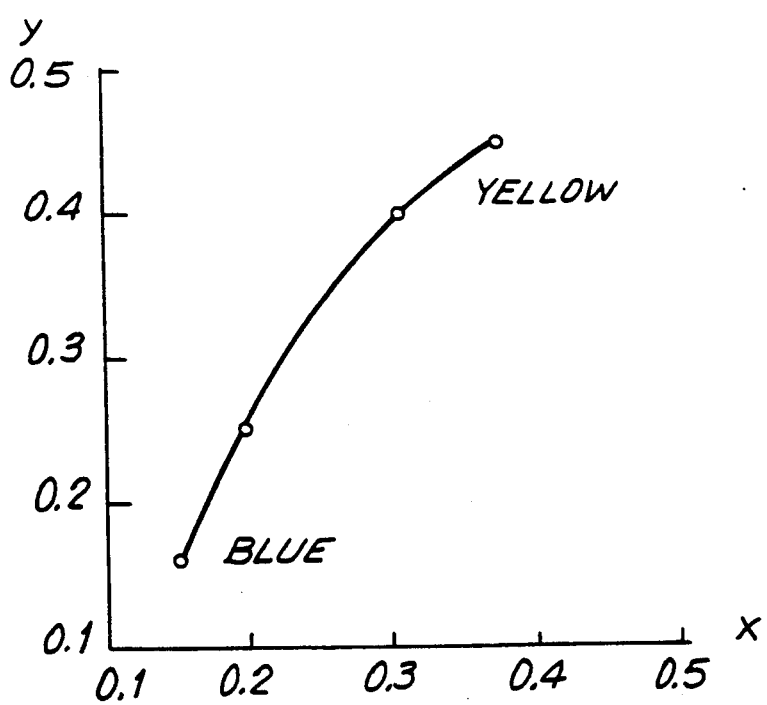
FIG. 18 is a chromaticity diagram showing color tones which can be created by a prior art liquid crystal display.

The effective voltage applied to second cell 301 by the driver circuit 40 of the display of Example 15 was varied from 10 V to 0 V. As a result, the green point (x, y)=(0.197, 0.386) shown in FIG. 13 turned blue, red and black as shown in FIG. 15. The other colors shown in FIG. 13 could also be changed by varying the effective voltage applied to second cell 301 by driver circuit 40 from 10 V to 0 V.

The composition of the liquid crystal material of Example 17 was the following:

 20 wt %

 20

 15

 25

 20 wherein R is an alkyl group

EXAMPLE 18

The liquid crystal material of first cell 201 of the display device of Example 15 were twisted to the left through 330° ($T_1=330°$). The liquid crystal material of second cell 301 were twisted to the right through 450° ($T_2=450°$). As in Example 15, driver circuit 40 applied an effective voltage of 10 V to second cell 301. Driver circuit 30 drove first cell 201 at eight different voltages at a duty ratio of 1/200. A wider angle of visibility could be obtained than in Example 15. When driver circuit 40 for second cell 301 was turned off, a black-and-white display was provided. The contrast ratio improved to 1:52.

When the liquid crystal materials in Examples 14-18 of second cell 301 were twisted to the left and those of first cell 201 were twisted to the right, the same results were obtained as with the original twist directions. When the liquid crystal molecules of the first and second cells were twisted in the same direction, an unsatisfactory, but similar effect occurred.

In the above embodiments and examples, driver circuit 40 for driving second cell 301 was a static driver circuit. However, other driving techniques can be substituted as long as the driving circuit applies voltages to electrodes 321a and 322a. Examples include a circuit driving a cell by the dynamic drive method, a driving circuit applying sinusoidal waves, and a driving circuit applying triangular waves.

A liquid crystal display similar to the embodiment of FIG. 9, but with the orientation of second cell 301 is changed from twisted to vertical was assembled. The vertical orientation is achieved by use of an orientation agent made from titanium. The relationship of the directions of rubbing to the absorption axes of the polarizers is as shown in FIG. 2. The following Example utilized this modified device.

EXAMPLE 19

The liquid crystal material 213 of first cell 201 was PCH including tolane. The optical anisotropy $\Delta n$ was 0.18, the thickness d of the liquid crystal layer was 8 μm and the product was 1.44 μm. Liquid crystal material 213 of first cell 201 was twisted to the left through 220° ($T_1=220°$) and angles $\theta_1$ and $\theta_2$ were set to 45°. Liquid crystal material 323 of second liquid crystal cell 301 exhibited negative dielectric anisotropy.

Figure 16:
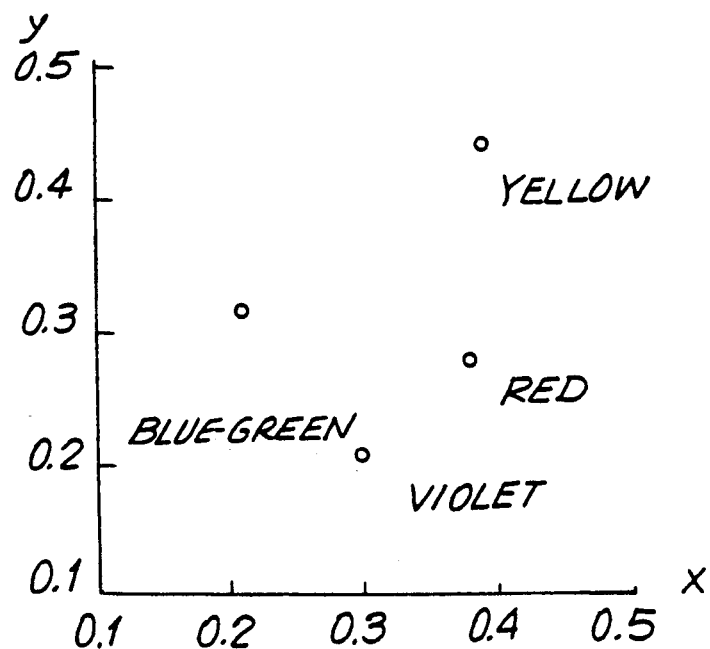
FIGS. 16 and 17 are chromaticity diagrams showing color tones created by a liquid crystal display formed in accordance with yet another embodiment of the invention.
Figure 17:
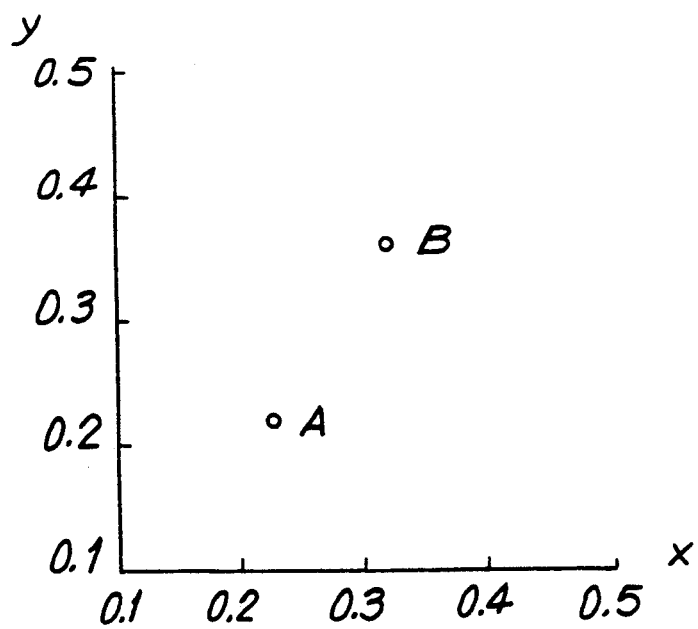

First cell 201 was driven by driver circuit 30 by the dynamic drive method at four voltages at a duty ratio of 1/100. Four colors including, blue-green, violet, red and yellow, were displayed as shown in the chromaticity diagram of FIG. 16. An effective voltage of 10 V was applied to second liquid crystal cell 301 by driver circuit 40. As shown in FIG. 17, when a non-selecting voltage having an effective voltage of 2.24 V was applied to second cell 301, bluish black color appeared at point A. When a selecting voltage having an effective voltage of 2.4 V was applied, yellowish white was displayed at point B. Thus, a substantially black-and-white display having a contrast ratio of 1:8 was provided.

Multiple colors are readily displayed by a liquid crystal display device formed by applying different voltages to the driving electrodes. When the liquid crystal cell is driven by dynamic drive method, multiple colors can be displayed with high contrast even at a low duty ratio of less than 1/100. In this manner, an inexpensive electrooptical device can be capable of displaying multiple colors more easily than prior art devices using color filters.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An electrooptical display device which displays different colors when driven with different driving voltages, comprising:
    a liquid crystal cell including a pair of opposed substrates having electrodes selectively disposed thereon, the substrates spaced apart distance d and a twisted nematic liquid crystal material between the substrates;
    each substrate having an orientation direction for aligning liquid crystal molecules adjacent the substrates to be substantially parallel with the orientation direction;
    the cell formed so that the value of the product of the optical anisotropy $\Delta n$ of the liquid crystal material and the thickness d of the liquid crystal layer is in excess of about 1.1 $\mu m$;
    a pair of polarizers disposed on the exterior sides of the liquid crystal cell; and
    circuit means for selectively generating voltage having at least three different values for displaying multiple colors coupled to the electrodes on the substrates.

2. The electrooptical display device of claim 1, wherein the twist angle of the liquid crystal material is in the range of about 180° to 360°.

3. The electrooptical display device of claim 2, wherein the circuit means is a dynamic driving circuit capable of applying, to the electrodes, a selecting voltage, a non-selecting voltage and at least one intermediate voltage.

4. The electrooptical display device of claim 3, wherein the directions of the axes of polarization of the polarizers are shifted from the orientation directions of the liquid crystal molecules adjacent to the substrate adjacent to the polarizer by 15° to 75°.

5. The electrooptical display device of claim 2, wherein the directions of the axes of polarization of the polarizers are shifted from the orientation directions of the liquid crystal molecules adjacent to the substrate adjacent to the polarizer by 15° to 75°.

6. The electrooptical display device of claim 2, wherein the optical anisotropy of the liquid crystal material is between about 0.1 and 0.25.

7. The electrooptical display device of claim 2, wherein the optical anisotropy of the liquid crystal material is between about 0.13 and 0.22.

8. The electrooptical display device of claim 2, wherein the liquid crystal layer is between about 5 and 12 $\mu m$ thick.

9. The electrooptical display device of claim 2, wherein the value of the product $\Delta n \cdot d$ is less than about 2.5.

10. The electrooptical display device of claim 1, wherein the at least three voltage values cause the device to display at least three of the colors red, green, yellow and blue, each different color corresponding to a different respective voltage.

11. The electrooptical display device of claim 10, wherein one of the voltages corresponds to the color red and another of the voltages corresponds to the color blue.

12. A method of providing a color display, comprising:
    applying a voltage to a liquid crystal display cell, the voltage including a selecting voltage, a non-selecting voltage and at least one intermediate voltage;
    the liquid crystal cell including a pair of opposed substrates having electrodes disposed thereon, the substrate spaced apart a distance d and a liquid crystal material between the substrates, the liquid crystal cell formed so that the value of the product of the optical anisotropy $\Delta n$ of the liquid crystal material and the thickness d of the liquid crystal layer being greater than about 1.1 $\mu m$ and a pair of polarizers are disposed on the exterior sides of the liquid crystal cell.

13. The method of claim 12, wherein the twist angle of the liquid material is in the range of between about 180° to 360°.

14. The method of claim 13, including applying at least three intermediate voltages between the selecting voltage and non-selecting voltage.

15. The method of claim 13, wherein the liquid crystal cell is driven by a dynamic drive and displays multiple colors at a duty ratio below about 1/100.

16. A liquid crystal display device which displays different colors when driven with different driving voltages, comprising:
    a liquid crystal cell including a pair of opposed substrates having electrodes selectively disposed thereon and a nematic liquid crystal material having a twist angle between about 180° and 360° within the cell and circuit means coupled to the electrodes for selectively generating voltages having at least three different values to be applied to the cell including a first voltage, a second voltage and a third voltage to cause the cell to display at least three different colors including a first, a second and a third different color, corresponding to the first, second and third voltages, respectively.

17. The liquid crystal display device of claim 16, wherein the first, second and third colors are at least three of the colors red, green, yellow and blue, respectively.

18. The liquid crystal display device of claim 17, wherein the first color is red, the second color is green and the third color is blue.

19. The liquid crystal display device of claim 16, wherein the first color is red and the second color is blue.

* * * * *